United States Patent
Hamagishi et al.

(10) Patent No.: US 7,630,131 B2
(45) Date of Patent: Dec. 8, 2009

(54) IMAGE DISPLAY APPARATUS AND OPTICAL MEMBER THEREFOR

(75) Inventors: Goro Hamagishi, Toyonaka (JP); Osamu Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 4 days.

(21) Appl. No.: 12/044,561

(22) Filed: Mar. 7, 2008

(65) Prior Publication Data
US 2008/0225373 A1    Sep. 18, 2008

(30) Foreign Application Priority Data
Mar. 15, 2007    (JP) ............................. 2007-066759

(51) Int. Cl.
*G02B 27/22* (2006.01)
(52) U.S. Cl. ........................ 359/463; 348/59
(58) Field of Classification Search .................. 359/463
See application file for complete search history.

(56) References Cited
U.S. PATENT DOCUMENTS

| | | | | |
|---|---|---|---|---|
| 6,069,650 A | * | 5/2000 | Battersby | 348/59 |
| 7,099,080 B2 | * | 8/2006 | Lipton et al. | 359/463 |
| 7,187,344 B2 | * | 3/2007 | Feenstra et al. | 345/6 |
| 2006/0158729 A1 | * | 7/2006 | Vissenberg et al. | 359/462 |
| 2007/0053060 A1 | * | 3/2007 | Jung | 359/463 |
| 2008/0123182 A1 | * | 5/2008 | Cernasov | 359/359 |
| 2008/0204872 A1 | * | 8/2008 | Ijzerman et al. | 359/463 |

FOREIGN PATENT DOCUMENTS

| | | |
|---|---|---|
| JP | 8-62533 | 3/1996 |
| JP | 2006-106608 | 4/2006 |

* cited by examiner

*Primary Examiner*—Lee Fineman
(74) *Attorney, Agent, or Firm*—Workman Nydegger (57) ABSTRACT

An image display apparatus capable of switching a display mode between a directional display mode where a first image is displayed in a first viewing direction and a second image is displayed in a second viewing direction and a non-directional display mode where the same image is displayed in both the first and second viewing directions. The apparatus includes an image forming unit and an optical member. The optical member is disposed adjacent to an emitting side of the image forming unit and is used for switching the display mode. The optical member includes two light-transmitting plate members, a lens member disposed between the two plate members, a refractive-index variable medium sealed in a gap between the lens member and the two plate members, and a refractive-index adjusting unit that adjusts a refractive index of the refractive-index variable medium. in order to switch between the directional and non-directional display mode.

4 Claims, 9 Drawing Sheets

FIG. 7 <NON-DIRECTIONAL DISPLAY MODE>

IMAGE DISPLAY APPARATUS AND OPTICAL MEMBER THEREFOR

BACKGROUND

1. Technical Field

The present invention relates to an image display apparatus capable of switching between directional image display and non-directional image display.

2. Related Art

There is an image display apparatus that displays different images (videos) for different viewing directions (hereinafter referred to as "directional image display"). One example of a directional image display apparatus is a three-dimensional image display apparatus that stereoscopically displays an image by providing different image light beams to the eyes of a single viewer. Another example is a directional image display apparatus that provides different images to two viewers. In these directional image display apparatuses, half of all pixels of a display unit display a first image and the other half display a second image. An optical member for limiting a direction in which image light is emitted (e.g., a parallax barrier or lenticular lens) is disposed in front of the display unit (adjacent to a viewer). The image display apparatus displays only a first image in a first viewing direction and displays only a second image in a second viewing direction (see, for example, JP-A-2006-106608).

A directional image display apparatus capable of switching between a directional display mode and a display mode that displays the same image in both directions (hereinafter referred to as "non-directional display"), i.e., a non-directional display mode, would be convenient. However, an image display apparatus capable of switching between a directional display mode and a non-directional display mode is not available.

SUMMARY

An advantage of some aspects of the invention is that it provides a technique that actualizes an image display apparatus capable of switching between directional image display and non-directional image display.

The invention aims to solve at least part of the above-described problems and can be actualized as a form or an application described below.

Application 1

An image display apparatus capable of switching a display mode between a directional display mode of displaying a first image in a first viewing direction and a second image in a second viewing direction and a non-directional display mode of displaying the same image in both the first and second viewing directions includes an image forming unit and an optical member. The image forming unit forms an image and emits image light representing the image. The optical member is disposed adjacent to an emitting side of the image forming unit and is used for switching the display mode. The optical member includes two light-transmitting plate members, a lens member disposed between the two plate members and having a predetermined refractive index, a refractive-index variable medium sealed in a gap between the lens member and the two plate members, and a refractive-index adjusting unit that adjusts a refractive index of the refractive-index variable medium. The refractive-index adjusting unit is configured to (i) set the optical member to be in a first usage state in which the optical member performs a lens action by adjusting the refractive-index variable medium to have a refractive index different from the predetermined refractive index so that the display mode of the image display apparatus is set to be the directional display mode and (ii) set the optical member to be in a second usage state in which the optical member functions as a light-transmitting plate performing no lens action by adjusting the refractive-index variable medium to have the same refractive index as the predetermined refractive index so that the display mode of the image display apparatus is set to be the non-directional display mode.

For the image display apparatus according to Application 1, in the directional display mode, the refractive index of the refractive-index variable medium differs from that of the lens member, and the optical member performs a lens action. Accordingly, the image display apparatus can display a first image in a first viewing direction and display a second image in a second viewing direction. In the non-directional display mode, the refractive index of the refractive-index variable medium is the same as that of the lens member, and the lens member does not perform a lens action and functions as a single light-transmitting plate. Accordingly, the image display apparatus can display the same image in both of the first and second viewing directions. In the non-directional display mode, an image can be displayed with a higher resolution than in the directional display mode.

Application 2

In the image display apparatus according to Application 1, the lens member may include two contact surfaces being in contact with the two plate members, respectively, and include a curved side portion formed between the two contact surfaces. In the first usage state, the optical member may be configured to perform the lens action on light passing through the curved side portion and not to perform the lens action on light passing through both of the two contact surfaces.

The quantity of the refractive-index variable medium sealed in the gap between the lens member and the two plate members can be smaller than that in an apparatus in which the lens member is separated from at least one of the two plate members. This can suppress an increase in the cost of manufacturing the image display apparatus. In the directional display mode, the curved side portion of the lens member can perform a lens action, thus enabling directional image display. Although the lens action is not performed on light passing through both of the two contact surfaces, the two contact surfaces can restrict a direction in which image light is emitted, thus enabling directional image display.

Application 3

In the image display apparatus according to Application 1, the refractive-index variable medium may be composed of a liquid crystal material.

In this case, the display mode can be switched between the directional display mode and the non-directional display mode by changing the refractive index of the liquid crystal material.

Application 4

In the image display apparatus according to Application 1, the lens member may be formed integrally with at least one of the two plate members.

In this case, a step of arranging the lens member at an appropriate position between the two plate members can be omitted. This can suppress an increase in the cost of manufacturing the image display apparatus.

The invention can be actualized in various forms. For example, it can also be actualized as an optical member for use in an image display apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

A best mode for carrying out the invention will now be described with reference to embodiments in the order described below.

A. First Embodiment

B. Second Embodiment

C. Third Embodiment

D. Fourth Embodiment

E. Fifth Embodiment

F. Modifications

A. First Embodiment

Figure 1:
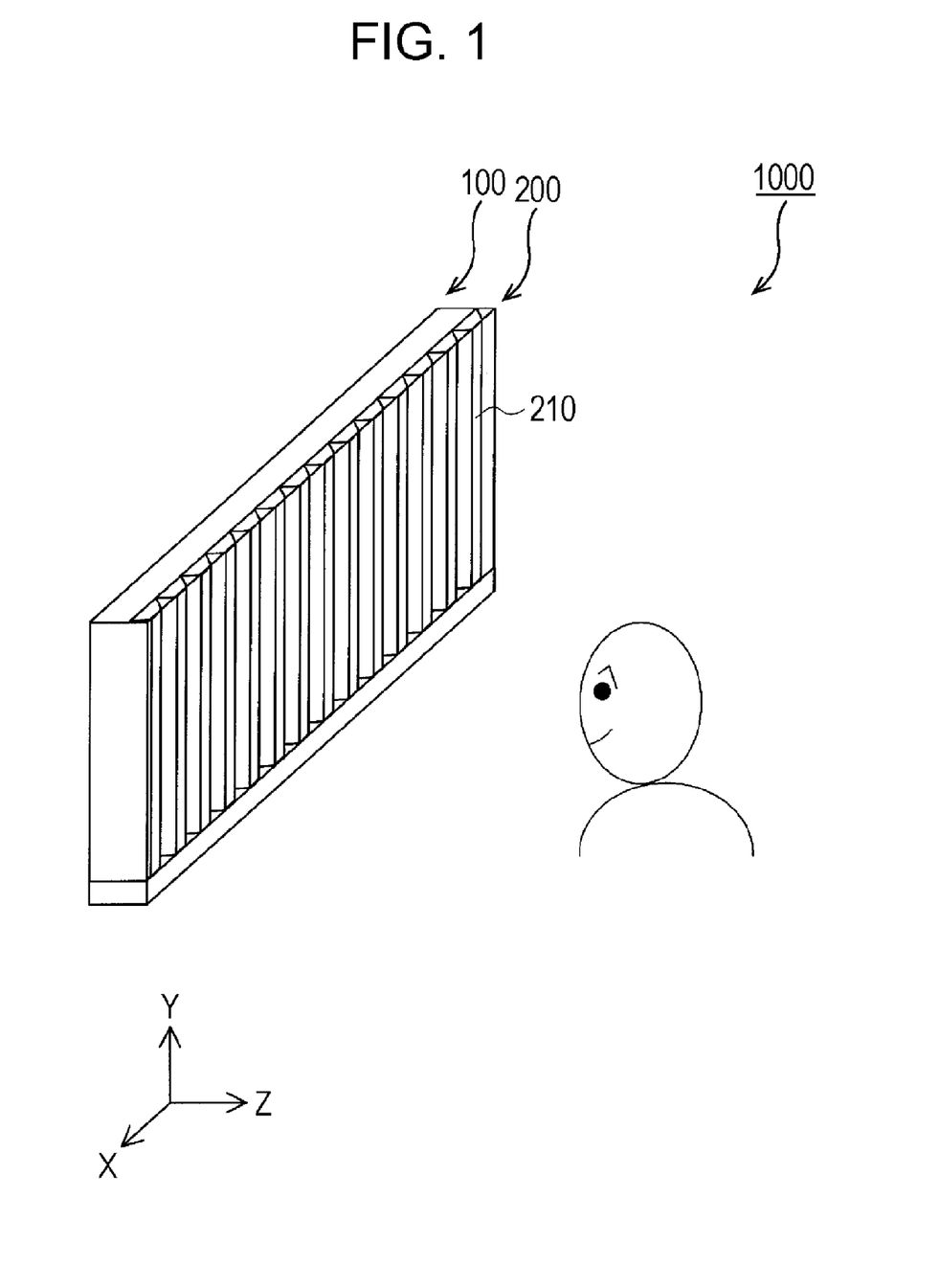
FIG. 1 illustrates an external view of an image display apparatus according to a first embodiment of the invention.

FIG. 1 illustrates an external view of an image display apparatus according to a first embodiment of the invention. The image display apparatus 1000 can function as a stereoscopic display device enabling stereoscopy and can also function as a normal display device (two-dimensional display device). When the image display apparatus 1000 functions as a stereoscopic display device, it operates in a directional display mode of displaying different images in a direction toward a left eye of a user (first viewing direction) and in a direction toward a right eye of the user (second viewing direction). When the image display apparatus 1000 functions as a 2D display device, it operates in a non-directional display mode of displaying the same image in both the first and second viewing directions.

Figure 2:
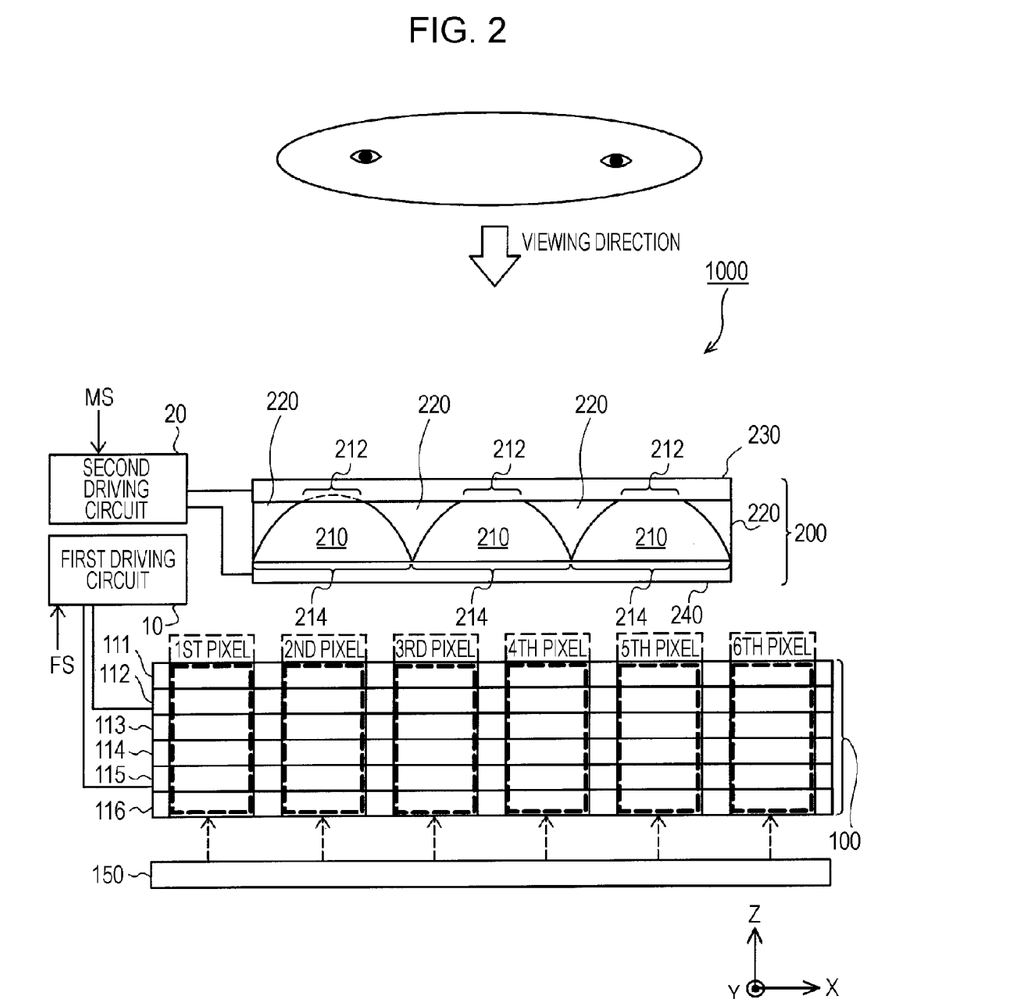
FIG. 2 is a block diagram that illustrates an internal structure of the image display apparatus shown in FIG. 1.

FIG. 2 is a block diagram that illustrates an internal structure of the image display apparatus 1000 shown in FIG. 1. The image display apparatus 1000 includes a liquid-crystal display unit 100, a backlight 150, a liquid-crystal lens 200, a first driving circuit 10, a second driving circuit 20, and a control unit (not shown), which will be described below. The liquid-crystal lens 200 is disposed between the liquid-crystal display unit 100 and the user. The liquid-crystal lens 200 includes a lower glass plate 240, an upper glass plate 230, a plurality of lens elements 210, and a plurality of liquid-crystal layers 220. Each of the two glass plates 230 and 240 includes a transparent electrode (not shown) formed on a surface thereof and has transparency as the whole substrate.

Each of the lens elements 210 is composed of a light-transmitting material. The light-transmitting material can be a material having a substantially constant refractive index, such as a synthetic resin, including urethane acrylate being a ultraviolet curable resin, and glass. As also illustrated in FIG. 1, the lens element 210 has a shape in which the apical part of one of cylindrical lenses aligned in the x-axis direction in a lenticular lens is removed. The lens element 210 includes a first base surface 212 in contact with the upper glass plate 230 and a second base surface 214 in contact with the lower glass plate 240. The base surfaces 212 and 214 are referred to also as "flat surfaces". The size of the first base surface 212 can be, for example, approximately 30% of the size of the second flat surface 214. In an example illustrated in FIG. 2, the number of lens elements 210 included in the liquid-crystal lens 200 is three. However, in actuality, a large number of lens elements are aligned in the x-axis direction (see FIG. 1).

Each of the liquid-crystal layers 220 (see FIG. 2) is composed of a liquid crystal material sealed in the gap between the lens element 210 and the upper glass plate 230. The refractive index of this liquid crystal material is changed by a change in the arrangement of the liquid crystal molecules in response to a voltage applied between transparent electrodes (not shown) of the two glass plates 230 and 240. More specifically, the liquid crystal material has characteristics in which when the applied voltage is 0V, the refractive index is N1; when the applied voltage is V1, the refractive index is N2 (>N1). The refractive index N2 when a predetermined voltage V1 is applied is the same as the refractive index (N2) of the light-transmitting material of the lens element 210. Examples of the liquid crystal material of the liquid-crystal layer 220 include terphenyl liquid crystal and liquid crystalline tolan. Among a plurality of kinds of liquid crystal material, including the above-described materials, a liquid crystal material that has optical characteristics that contains the refractive indices N1 and N2 within a range of variations of the refractive index is selected. The voltage V1 at which the refractive index is N2 can be determined from an experiment.

The liquid-crystal display unit 100 includes a lower polarizer 116, a lower glass substrate 115, a liquid-crystal layer 114, a color-filter layer 113, an upper glass substrate 112, and an upper polarizer 111, and they are stacked on top of each other. The lower glass substrate 115 includes pixel electrodes (not shown). The upper glass substrate 112 includes a common electrode (not shown). In the liquid-crystal layer 114, which is disposed between the two glass substrates 112 and 115, the alignment of liquid crystal molecules varies with a change in a driving signal output by the first driving circuit 10 (a change in a voltage between the pixel electrodes and the common electrode). The first driving circuit 10 generates a driving signal based on an image signal FS supplied from the control unit (described below) and outputs it to the liquid-crystal display unit 100. In response to this, an image is displayed on the liquid-crystal display unit 100. In the liquid-crystal display unit 100, a region extending along the z-axis direction corresponding to each of the pixel electrodes (not shown) is called a "pixel". In an example illustrated in FIG. 2, six pixels (first to sixth pixels) are indicated by broken lines in the form of a rectangular. However, in actuality, a larger number of pixels are arranged in a matrix in the xy-plane.

Figure 3:
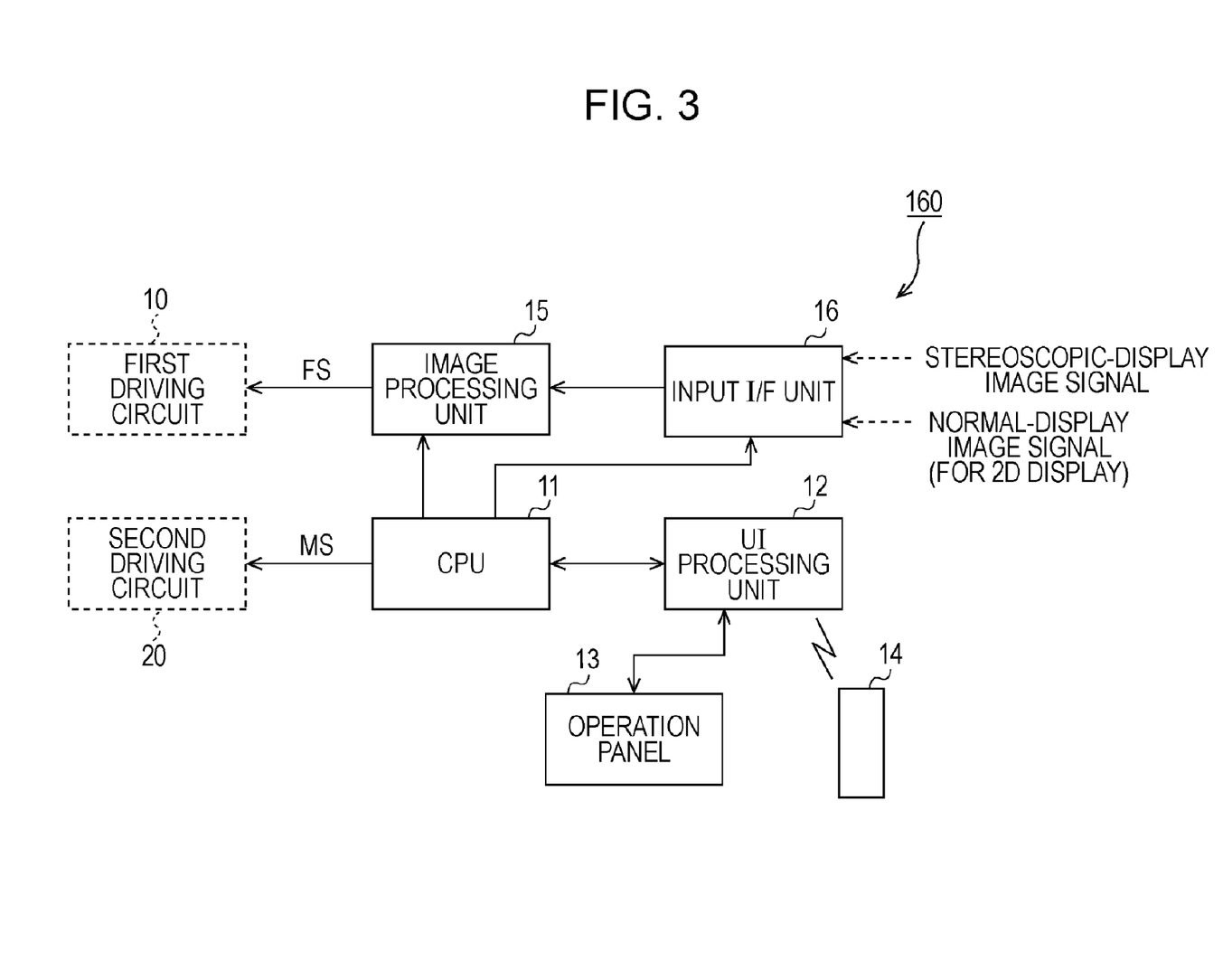
FIG. 3 is a block diagram that illustrates a schematic configuration of a control unit included in the image display apparatus.

FIG. 3 is a block diagram that illustrates a schematic configuration of the control unit included in the image display apparatus 1000. The control unit 160 includes a central processing unit (CPU) 11, a user interface (UI) processing unit 12, an operation panel 13, a remote controller 14, an image processing unit 15, and an input interface unit 16. The input interface unit 16 transmits an image signal input from an image reproducing apparatus (e.g., a digital versatile disc (DVD) player or computer), not shown, as image data in a predetermined format to the image processing unit 15. The input interface unit 16 can receive an image signal for stereoscopic display (an image signal for a composite image of a first image for a left eye and a second image for a right eye) and can also receive an image signal for normal display (for two-dimensional display). The image processing unit 15 adjusts input image data, such as resizing or adjustment of brightness and contrast, and then outputs an image signal FS to the first driving circuit 10. The UI processing unit 12 provides the CPU 11 with instructions input from a user through the operation panel 13 or the remote controller 14. The CPU 11 controls the image processing unit 15 and the second driving circuit 20 in accordance with the instructions from the user.

Each of the operation panel 13 and the remote controller 14 has a display-mode switching switch (not shown) for use in switching the display mode between a directional display mode and a non-directional display mode. By operating this display-mode switching switch (not shown), the user can switch (select) the display mode according to the type of an input image (a stereoscopic-display image or normal-display image). When the user switches the display mode, information on the selected display mode is issued from the UI processing unit 12 to the CPU 11. The CPU 11 transmits a display-mode signal MS indicating the selected display mode to the second driving circuit 20. The second driving circuit 20 outputs a driving signal to the transparent electrodes (not shown) of the two glass plates 230 and 240 according to the display mode indicated by the received display-mode signal MS. More specifically, the voltage 0V is applied for the directional display mode, and the voltage of V1 is applied for the non-directional display mode.

The liquid-crystal display unit 100 corresponds to an image forming unit in the following claims. The liquid-crystal lens 200 corresponds to an optical member in the following claims. The two glass plates 230 and 240 correspond to two plate members in the following claims. The CPU 11 and the second driving circuit 20 correspond to a refractive-index adjusting unit in the following claims.

Figure 4:
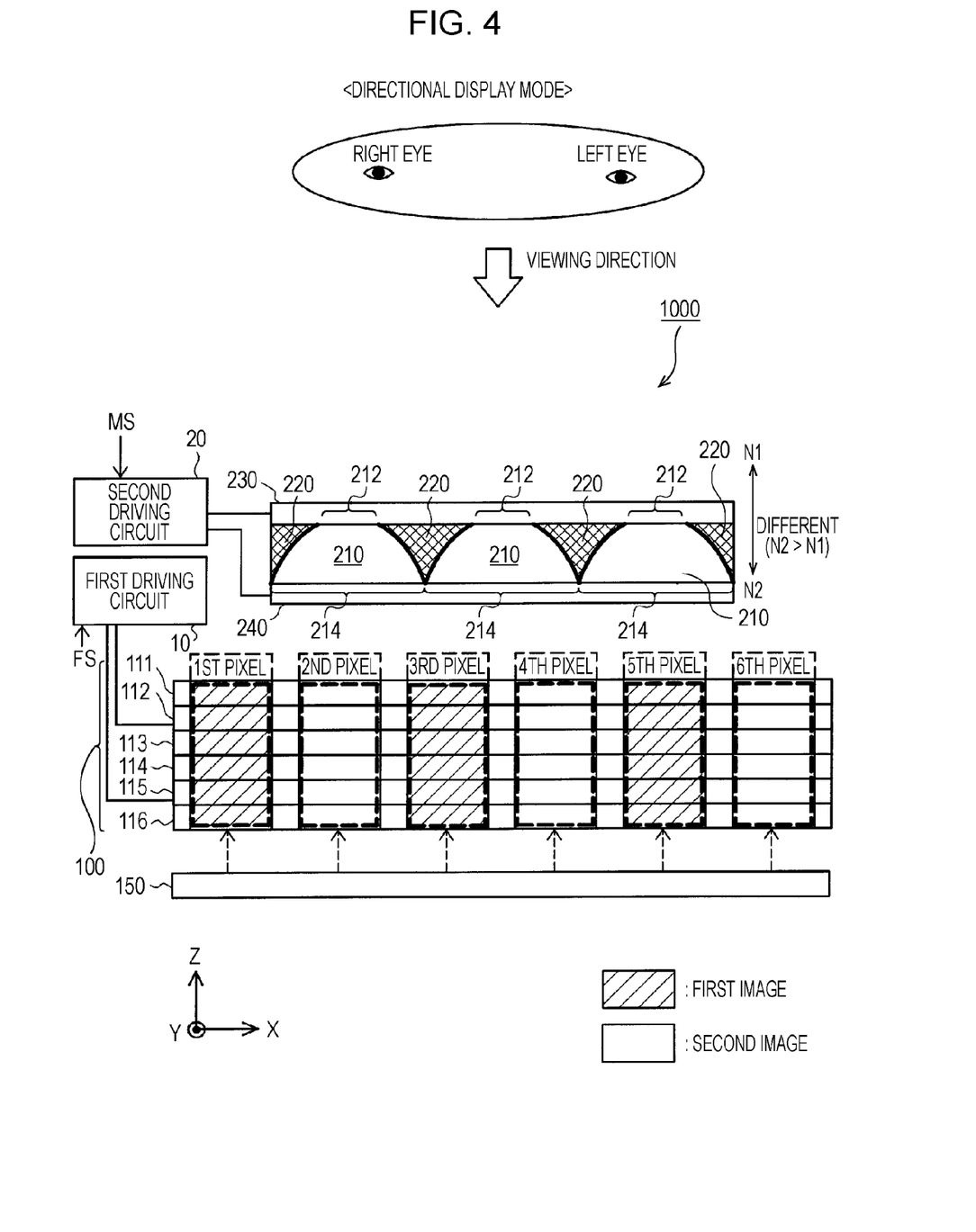
FIG. 4 illustrates a state of the image display apparatus operating in a directional display mode.

FIG. 4 illustrates a state of the image display apparatus 1000 operating in the directional display mode. In FIG. 4, the control unit 160 is omitted. In the directional display mode, a first image is displayed on the first, third, and fifth pixels, and a second image is displayed on the second, fourth, and sixth pixels. At this time, the refractive index of the liquid-crystal layer 220 is set at N1. The refractive index N1 is smaller than the refractive index N2 of the lens element 210. Accordingly, the liquid-crystal lens 200 is in a state in which it performs a lens action (has a power).

Figure 5:
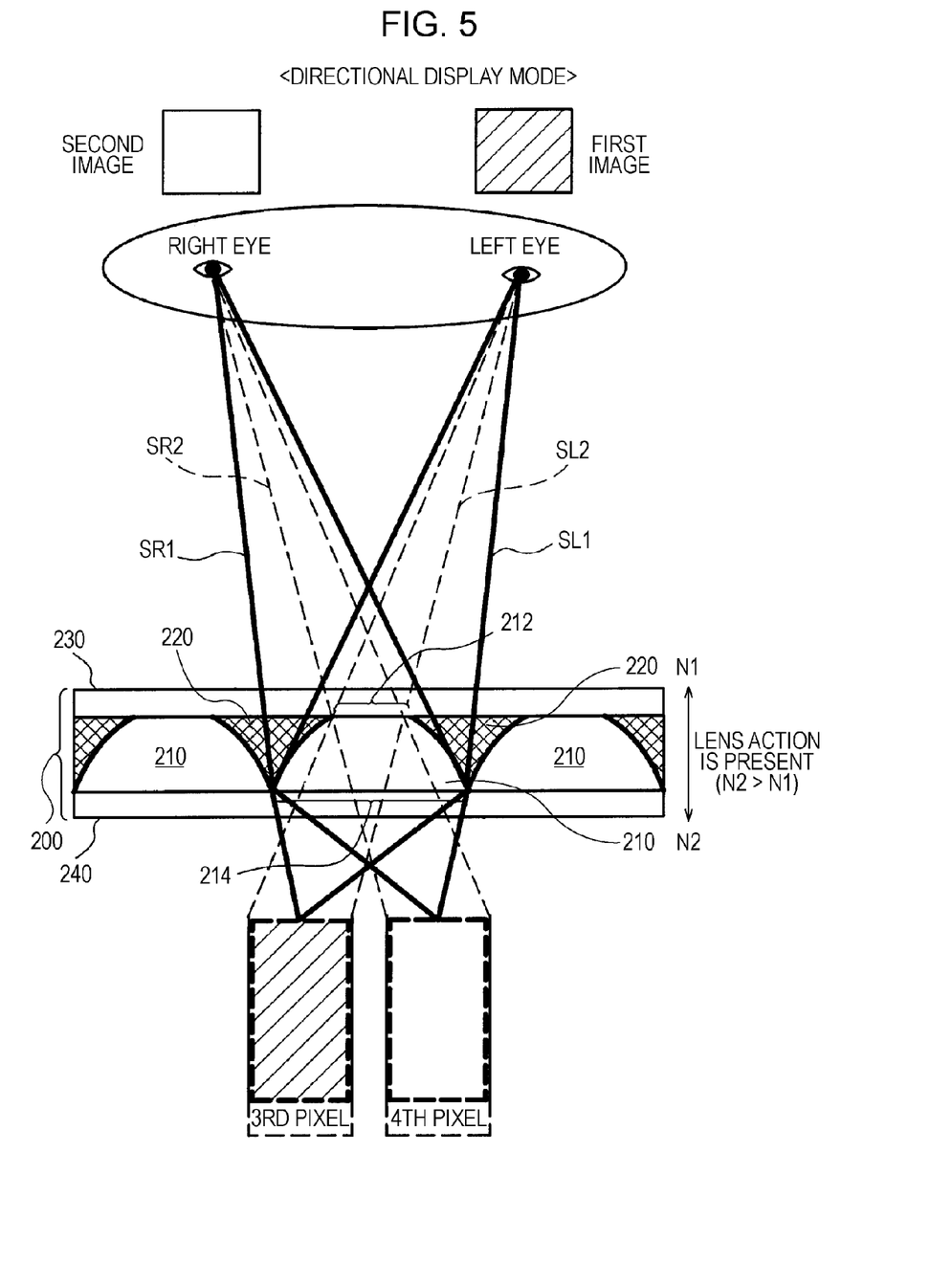
FIG. 5 is a schematic view of image light beams passing through a lens element in the directional display mode.

FIG. 5 is a schematic view of image light beams passing through the lens element 210 in the directional display mode. Because the lens element 210 has a shape in which the apical part of a cylindrical lens is removed, as described above, a curved side portion functions as a cylindrical lens. More specifically, the lens element 210 refracts an image light beam SL1 emitted from the third pixel at the curved portion so as to function such that an image point of an image represented by the third pixel is located at the position of the left eye of a user. In an analogous fashion, the lens element 210 refracts an image light beam SR1 emitted from the fourth pixel at the curved portion so as to function such that an image point of an image represented by the fourth pixel is located at the position of the right eye of the user. In an analogous fashion, although not illustrated, an image point of an image represented by each of the first and fifth pixels is located at the position of the left eye, and an image point of an image represented by each of the second and sixth pixels is located at the position of the right eye. As described above, the first image is displayed on the first, third, and fifth pixels, and the second image is displayed on the second, fourth, and sixth pixels. Therefore, the first image is projected on the left eye of the user, and the second image is projected on the right eye.

The upper first base surface 212 does not have the function of a cylindrical lens. However, the first base surface 212 functions just like an aperture of a parallax barrier. More specifically, for example, an image light beam SL2 that passed through the first base surface 212 after being emitted from the third pixel reaches the left eye of the user, but does not reach the right eye. Similarly, an image light beam SR2 that passed through the first base surface 212 after being emitted from the fourth pixel reaches the right eye of the user, but does not reach the left eye. In such a manner, each of the lens elements 210 functions as an aperture of a parallax barrier at its base surface having a parallel-plate shape positioned in its center and functions as a lenticular lens at its curved portion on both sides, thus enabling the image display apparatus 1000 to operate in the directional display mode.

Figure 6:
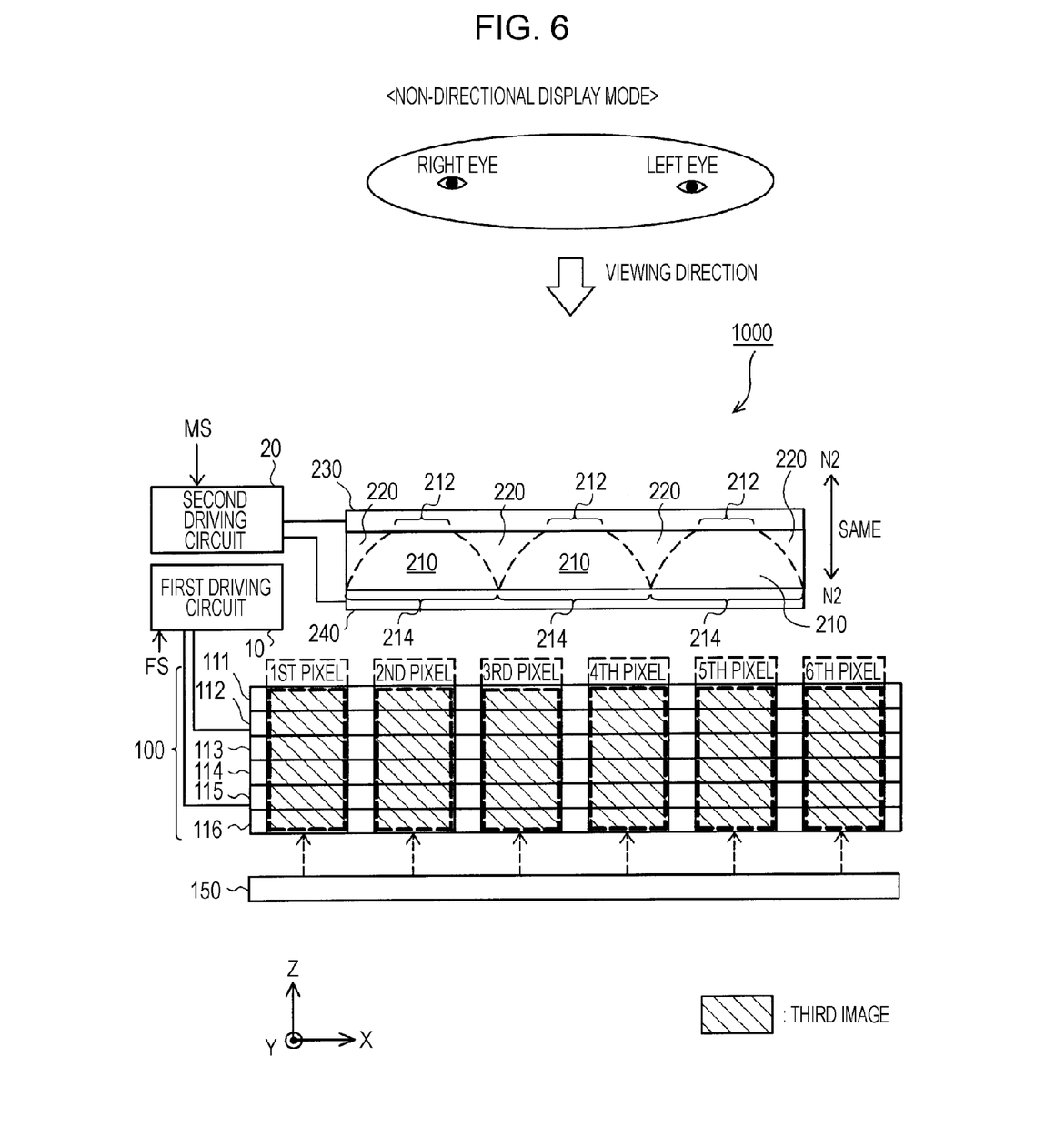
FIG. 6 illustrates a state of the image display apparatus operating in a non-directional display mode.

FIG. 6 illustrates a state of the image display apparatus 1000 operating in the non-directional display mode. In the non-directional display mode, a single image (third image) is displayed using all pixels (the first to sixth pixels). In the above-described directional display mode, two images constituting a composite image are displayed such that each of the two images is displayed by a half of all pixels. In contrast, in the non-directional display mode, the same image is displayed using all pixels. Accordingly, the resolution of a normal-display image displayed in the non-directional display mode can be twice the resolution of a stereoscopic-display image displayed in the directional display mode.

In the non-directional display mode, the refractive index of the liquid-crystal layer 220 is set at the same value (N2) as the refractive index of the lens element 210. As a result, the liquid-crystal lens 200 is set to be in a state where it is considered as a single light-transmitting plate in terms of optics.

Figure 7:
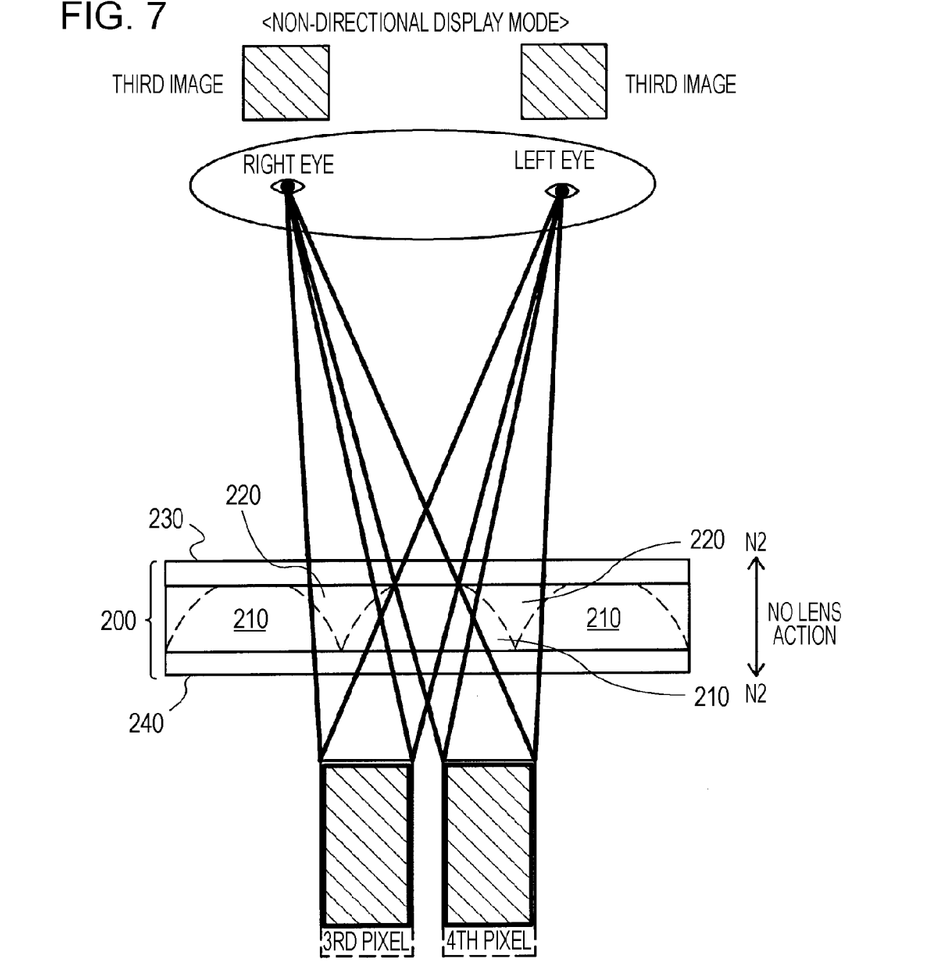
FIG. 7 is a schematic view of image light beams passing through the lens element in the non-directional display mode.

FIG. 7 is a schematic view of image light beams passing through the lens element 210 in the non-directional display mode. As described above, in the non-directional display mode, the liquid-crystal lens 200 can be considered as a single light-transmitting plate. Accordingly, image light beams emitted from both the third and fourth pixels reach both eyes of a user. This enables an image having a relatively high resolution displayed on the liquid-crystal display unit 100 to be seen by the user as an image in which that resolution is maintained.

As described above, the image display apparatus 1000 sets the liquid-crystal lens 200 to be in a state in which it can be considered as a single light-transmitting plate by setting the refractive index of the liquid-crystal layer 220 at the same value as the refractive index of the lens element 210. This enables operation in the non-directional display mode. In contrast, the image display apparatus 1000 sets the liquid-crystal lens 200 to be in a state in which it perform a lens action by setting the refractive index of the liquid-crystal layer 220 at a different value from the refractive index of the lens element 210. This enables operation in the directional display mode. In the liquid-crystal lens 200, the lens element 210 is in surface contact with the two glass plates 230 and 240. Therefore, the quantity of a liquid crystal material in the liquid-crystal layer 220 can be smaller than that in an apparatus in which the liquid-crystal lens 200 is separated from at least one of the two glass plates 230 and 240. This can suppress an increase in the cost of manufacturing the image display apparatus 1000.

B. Second Embodiment

Figure 8:
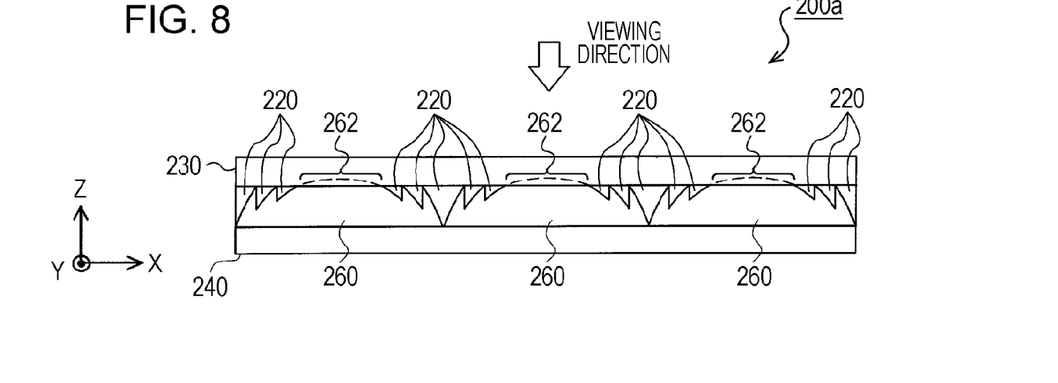
FIG. 8 is a diagram that illustrates a schematic structure of a liquid-crystal lens according to a second embodiment.

FIG. 8 is a diagram that illustrates a schematic structure of a liquid-crystal lens according to a second embodiment. The liquid-crystal lens 200a differs from the liquid-crystal lens 200 (in FIG. 2) in that a lens element 260 has a different shape from the lens element 210. The other configuration is substantially the same as in the first embodiment. The lens element 260 in the second embodiment has a shape in which the central tip of a Fresnel lens extending along the y-axis direction is removed such that a first base surface 262 is formed there. The first base surface 262 is in contact with the upper glass plate 230. The liquid-crystal lens 200a in the second embodiment has substantially the same advantages as the liquid-crystal lens 200 in the first embodiment.

C. Third Embodiment

Figure 9:
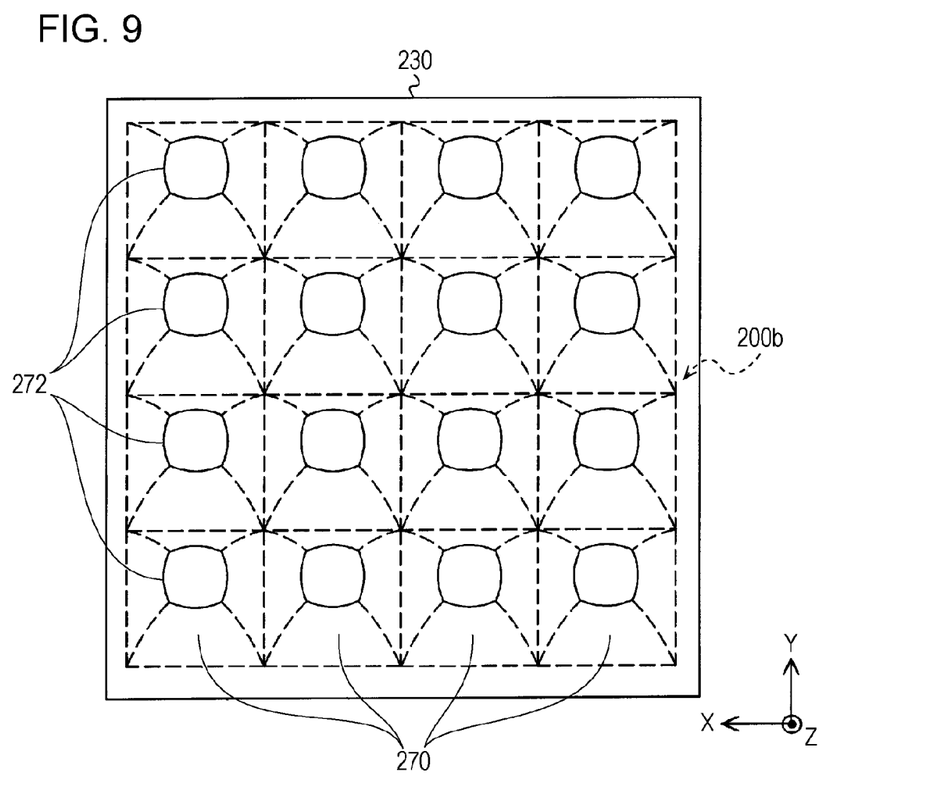
FIG. 9 is a diagram that illustrates a schematic structure of a liquid-crystal lens according to a third embodiment.

FIG. 9 is a diagram that illustrates a schematic structure of a liquid-crystal lens according to a third embodiment. The liquid-crystal lens 200b differs from the liquid-crystal lens 200 (in FIG. 1) in the first embodiment in that a lens element 270 has a different shape from the lens element 210. The other configuration is substantially the same as in the first embodiment. For the sake of description, FIG. 9 illustrates the liquid-crystal lens 200b seen through the upper glass plate 230 viewed from the user side. The lens element 270 in the third embodiment has a shape in which the tip of one of small lenses arranged in an array on the xy-plane, a so-called fly-eye lens array, is removed such that a first base surface 272 is formed there. The first base surface 272 is in contact with the upper glass plate 230. The liquid-crystal lens 200b in the third embodiment also has substantially the same advantages as the liquid-crystal lens 200 in the first embodiment.

D. Fourth Embodiment

Figure 10:
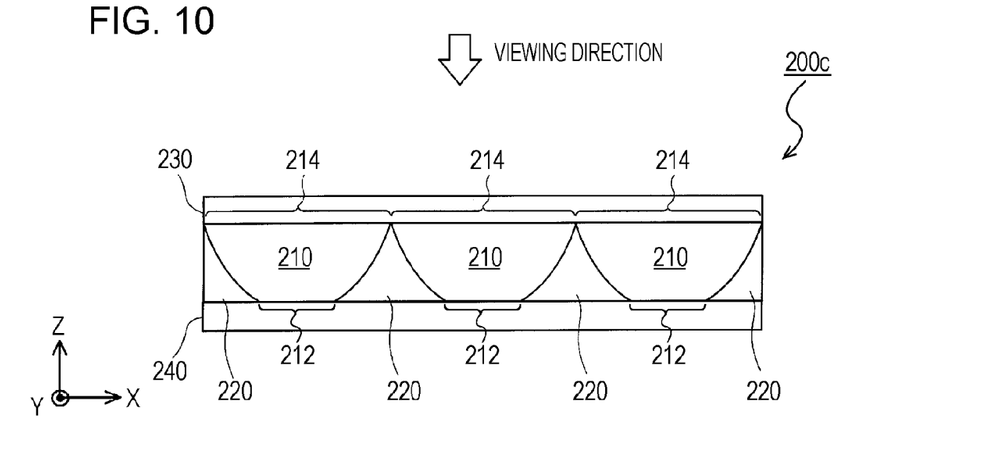
FIG. 10 is a diagram that illustrates a schematic structure of a liquid-crystal lens according to a fourth embodiment.

FIG. 10 is a diagram that illustrates a schematic structure of a liquid-crystal lens according to a fourth embodiment. The liquid-crystal lens 200c differs from the liquid-crystal lens 200 (in FIG. 2) in the first embodiment in that a portion consisting of the lens elements 210 and the liquid-crystal layers 220 is reversed with respect to the z-axis direction. The other configuration is substantially the same as in the first embodiment. The liquid-crystal lens 200c in the fourth embodiment also has substantially the same advantages as the liquid-crystal lens 200 in the first embodiment.

E. Fifth Embodiment

Figure 11:
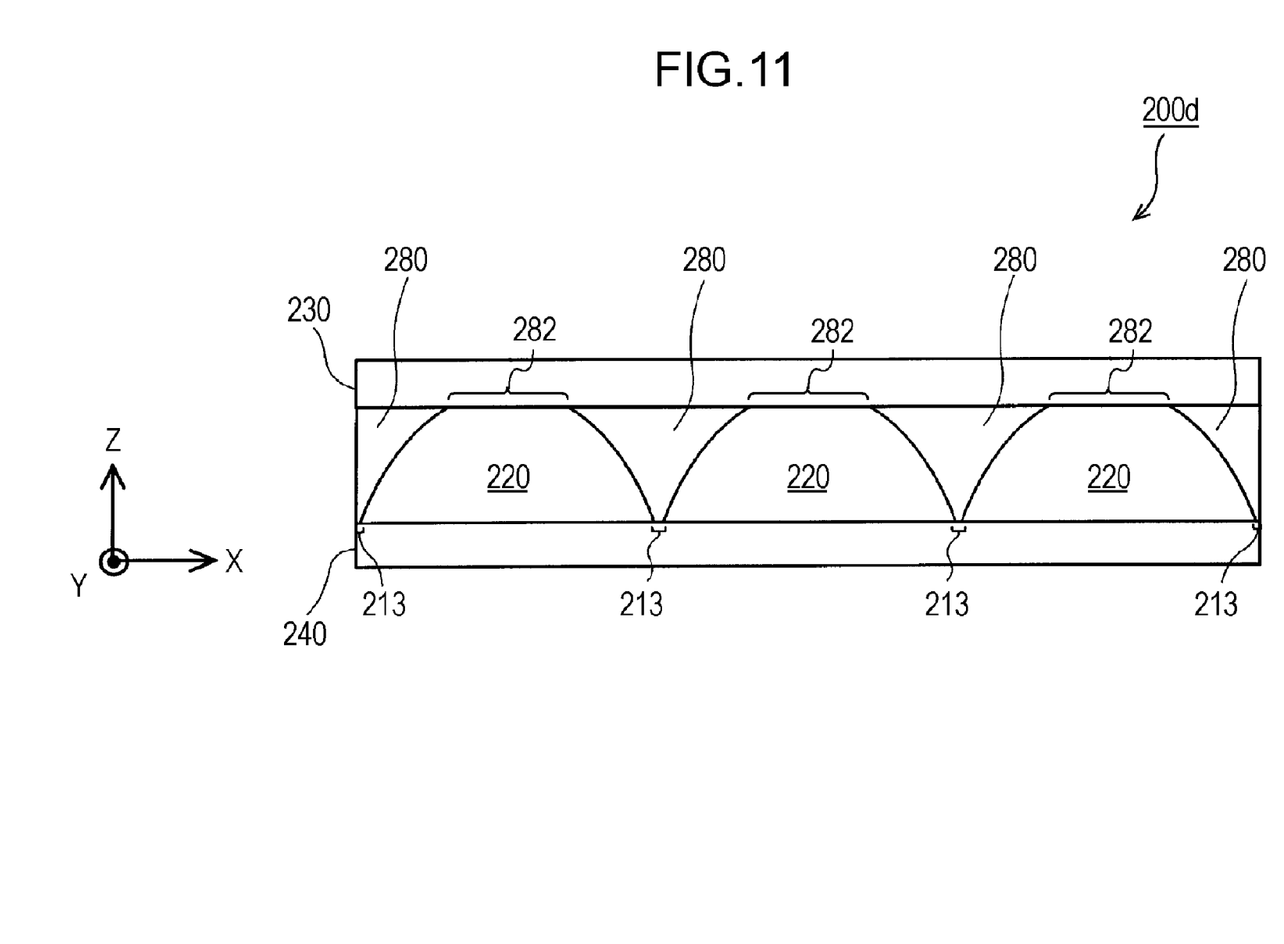
FIG. 11 is a diagram that illustrates a schematic structure of a liquid-crystal lens according to a fifth embodiment.

FIG. 11 is a diagram that illustrates a schematic structure of a liquid-crystal lens according to a fifth embodiment. The liquid-crystal lens 200d differs from the liquid-crystal lens 200 (in FIG. 2) in the first embodiment in that the shape of each of a lens element 280 and a liquid-crystal layer 220 is different from that of the liquid-crystal lens 200. The other configuration is substantially the same as in the first embodiment. The lens element 280 in the fifth embodiment has a shape in which the peripheral end of a concave lens extending along the y-axis direction is removed such that a second base surface 213 is formed there. In other words, a portion corresponding to the liquid-crystal layer 220 in the first embodiment is replaced with the lens element 280, and a potion corresponding to the lens element 210 in the first embodiment is replaced with the liquid-crystal layer 220 in the fifth embodiment.

In this case, the liquid crystal material constituting the liquid-crystal layer 220 has a refractive index N2 when an applied voltage is a predetermined voltage V1. When the applied voltage is a predetermined voltage V3, the liquid crystal material has a refractive index N3 being larger than N2. The voltage V3 at which the refractive index of the liquid crystal material is N3 can be determined from an experiment. In the present embodiment, a voltage applied by the second driving circuit 20 differs from that in the first embodiment. More specifically, the second driving circuit 20 applies the voltage V3 in the directional display mode and applies the voltage V2 in the non-directional display mode.

In the directional display mode, the refractive index of the liquid-crystal layer 220 is N3, which is larger than the refractive index N2 of the surrounding lens element 280. Therefore, the liquid-crystal layer 220 functions as a cylindrical lens at its curved portion on both sides and functions as an aperture of a parallax barrier at an upper base surface 282 being in contact with the upper glass plate 230. This enables the image display apparatus 1000 to operate in the directional display mode. In the non-directional display mode, the refractive index of the liquid-crystal layer 220 is N2, which is the same as that of the surrounding lens element 280. Therefore, as in the case of the first embodiment, the liquid-crystal lens 200d can be set to be in a state in which it can be considered as a single light-transmitting plate. This enables the image display apparatus 1000 to operate in the non-directional display mode. Accordingly, the liquid-crystal lens 200d in the fifth embodiment also has substantially the same advantages as the liquid-crystal lens 200 in the first embodiment.

F. Modifications

Among the components in the above-described embodiments, components other than the components claimed in the independent claims are additional ones, so they can be omitted if needed. The invention is not limited to the above-described embodiments and can be made in various forms without departing from the scope of the invention. Examples of modifications are described below.

F1. Modification 1

The image display apparatus 1000 in the embodiments described above has the function of a stereoscopic display device. However, the invention is applicable to an image display apparatus that has the function of a display device displaying different 2D images for different users. That is, different images can be displayed in a first viewing direction and in a second viewing direction, where the first viewing direction represents a direction toward a first user and the second viewing direction represents a direction toward a second user. Even with this structure, in the directional display mode, different images can be displayed to different users; in the non-directional display mode, an image (2D image) can be displayed with a higher resolution than that in the directional display mode.

F2. Modification 2

In the above-described embodiments, the lens element is in surface contact with the upper glass plate 230 and the lower glass plate 240. However, instead of this, the lens element may be in surface contact with either one of the two glass plates 230 and 240 and be in point contact with the other one. Alternatively, the lens element may be in surface contact with either one of the two glass plates 230 and 240 and be separated from the other one. In this case, the lens element may have no base surface. Even with these structures, the apparatus can operate in both the directional display mode and the non-directional display mode. As is apparent from the above-described embodiments and modifications, the lens element can be arranged at any position between the two glass plates 230 and 240.

F3. Modification 3

In the above-described embodiments, the lens element is formed independently of the upper glass plate 230 and the lower glass plate 240. However, the lens element may be formed integrally with at least one of the upper glass plate 230 and the lower glass plate 240. In this case, a step of arranging the lens element at an appropriate position between the two glass plates 230 and 240 can be omitted, and therefore, an increase in the cost of manufacturing the image display apparatus 1000 can be suppressed.

F4. Modification 4

In the above-described embodiments, the liquid crystal material is used as a medium having a variable refractive index. However, the medium is not limited to the liquid crystal material. Any material having a variable refractive index can be used. For example, lead lanthanum zirconate titanate (PLZT) can be used.

F5. Modification 5

In the above-described embodiments, the lens element has a shape resembling a cylindrical lens, a Fresnel lens extending along the y-axis direction, or a concave lens extending along the y-axis direction. However, the shape of the lens element is not limited to these shapes. A lens having any shape can be used.

The entire disclosure of Japanese Patent Application No: 2007-066759, filed Mar. 15, 2007 is expressly incorporated by reference herein.

What is claimed is:

1. An image display apparatus capable of switching a display mode between a directional display mode of displaying a first image in a first viewing direction and a second image in a second viewing direction and a non-directional display mode of displaying the same image in both the first and second viewing directions, the image display apparatus comprising:
   an image forming unit that forms an image and emits image light representing the image; and
   an optical member disposed adjacent to an emitting side of the image forming unit and used for switching the display mode, the optical member including:
   two light-transmitting plate members;
   a lens member disposed between the two plate members and having a predetermined refractive index;
   a refractive-index variable medium sealed in a gap between the lens member and the two plate members; and
   a refractive-index adjusting unit that adjusts a refractive index of the refractive-index variable medium,
   wherein the refractive-index adjusting unit is configured to:
   (i) set the optical member to be in a first usage state in which the optical member performs a lens action by adjusting the refractive-index variable medium to have a refractive index different from the predetermined refractive index so that the display mode of the image display apparatus is set to be the directional display mode; and
   (ii) set the optical member to be in a second usage state in which the optical member functions as a light-transmitting plate performing no lens action by adjusting the refractive-index variable medium to have the same refractive index as the predetermined refractive index so that the display mode of the image display apparatus is set to be the non-directional display mode, and
   wherein the lens member includes two contact surfaces being in contact with the two plate members, respectively, and includes a curved side portion formed between the two contact surfaces,
   wherein, in the first usage state, the optical member is configured to perform the lens action on light passing through the curved side portion and not to perform the lens action on light passing through both of the two contact surfaces.

2. The image display apparatus according to claim 1, wherein the refractive-index variable medium is composed of a liquid crystal material.

3. The image display apparatus according to claim 1, wherein the lens member is formed integrally with at least one of the two plate members.

4. An optical member for use in an image display apparatus capable of switching a display mode between a directional display mode of displaying a first image in a first viewing direction and a second image in a second viewing direction and a non-directional display mode of displaying the same image in both the first and second viewing directions, the optical member being used for switching the display mode, the optical member comprising:
   two light-transmitting plate members;
   a lens member disposed between the two plate members and having a predetermined refractive index;
   a refractive-index variable medium sealed in a gap between the lens member and the two plate members; and
   a refractive-index adjusting unit that adjusts a refractive index of the refractive-index variable medium,
   wherein the refractive-index adjusting unit is configured to:
   (i) set the optical member to be in a first usage state in which the optical member performs a lens action by adjusting the refractive-index variable medium to have a refractive index different from the predetermined refractive index so that the display mode of the image display apparatus is set to be the directional display mode; and
   (ii) set the optical member to be in a second usage state in which the optical member functions as a light-transmitting plate performing no lens action by adjusting the refractive-index variable medium to have the same refractive index as the predetermined refractive index so that the display mode of the image display apparatus is set to be the non-directional display mode, and wherein the lens member includes two contact surfaces being in contact with the two plate members, respectively, and includes a curved side portion formed between the two contact surfaces, wherein, in the first usage state, the optical member is configured to perform the lens action on light passing through the curved side portion and not to perform the lens action on light passing through both of the two contact surfaces.

* * * * *